> United States Patent Office 3,605,597
Patented Sept. 20, 1971

3,605,597
DEVICE FOR PREVENTING THE REVERSE MOVEMENT OF FILM
Yoshihisa Katsuyama, Yokohama-shi, Japan, assignor to Nippon Kogaku K.K., Tokyo, Japan
Filed Jan. 8, 1969, Ser. No. 789,698
Claims priority, application Japan, Jan. 19, 1968, 43/3,242
Int. Cl. G03b 19/04, 1/42
U.S. Cl. 95—31R          9 Claims

ABSTRACT OF THE DISCLOSURE

A device for regulating the rest position of film in a movie camera having claw means for intermittently feeding the film in forward and reverse directions employs a pair of oppositely arranged film locking members. Each film locking member has one end connected to the body of the camera and an opposite free end. The free end of each film locking member is formed to provide a pawl for entry into a film perforation and a laterally spaced portion which is cooperable with a slide member. The film locking members are biased so that their pawl members are normally urged toward the film for entry into the perforations. The slide member is movable to selectively engage one or the other film locking members at its slide member cooperable portion to selectively retract one pawl from a film perforation while the other pawl remains in a film perforation.

---

Figure 1:
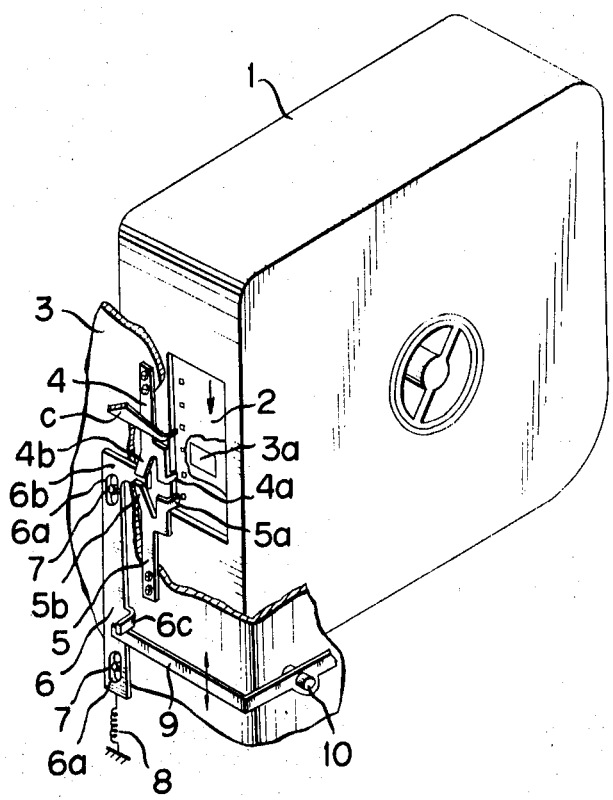

The invention relates to a registering device for film as it is fed in a movie camera, and is more particularly directed to an improvement of the registering device disclosed in Pat. No. 3,514,197, granted May 26, 1970 entitled "Rewinding Means in a Magazine Type Motion Picture Camera."

The camera disclosed in Pat. No. 3,514,197, when double exposure is desired the film winding means is stopped and the film is transmitted by a film transfer device to loosen the film. Consequently, the feed claw of the film transfer device gets out of the film perforation and the film retrogresses reversely due to the elasticity of the film before the claw is inserted into the same perforations. This results in the displacement of the exposure surface of the film.

In order to solve this problem, several devices have been proposed for registering the film at its rest position by means to prevent the reverse movement of the film in cooperation with the film transfer device. However, these registering devices are rather complicated in construction so that difficulty in operation is often encountered. Moreover, the prior art devices are expensive to manufacture.

An object of the invention is to overcome the aforementioned limitations. According to the invention, a device of simplified and inexpensive construction is provided to afford a minimum of operational problems.

The device of the invention comprises two film locking members of like construction, preferably of elastic or resilient material. One end of a film locking member is fixed to the camera body, and has a locking pawl preventing the reverse motion of the film and a specifically inclined surface at opposite or free. The film locking member is mounted so that the pawl is urged toward the film surface. The other film locking member is installed face to face with the said first film locking member to work reversely against the said first film locking member. In addition to this, a slide plate or member is provided to engage the said two inclined surfaces. The slide member is movable to selectively engage one or the other inclined surface of the respective film locking members to selectively retract one pawl from a film perforation while the other pawl remains in film perforation engaged position.

This invention will be described more clearly referring to the illustrative embodiment shown in the attached drawing in which:

FIG. 1 is a perspective view of the invention, the camera body being partially shown for clarity in illustration.

Referring to FIG. 1, 1 represents a film magazine, 2 the film, and 3 the camera body. An aperture 3a is provided at a specific position corresponding to the location of the film. A film locking member 4 made of an elastic material has one end formed to provide a pawl 4a which acts to stop the upward advance of the film. As shown, this same or free end of the film locking member also is provided with a portion 4b laterally spaced from the pawl 4a. The portion 4b is bent out of the plane of the film locking member to provide an inclined surface for engagement by a portion 6b of a slide plate or member 6 to be subsequently described. The other end of the film locking member 4 is fixed to the camera body 3 so that the pawl 4a is urged or biased toward the film 2.

A second film locking member 5, which functions in reverse to the film locking member 4, has one end formed to provide a pawl 5a to stop the downward advance of the film 2. Like the film locking member 4, the other or second film locking member 5 also is provided with a laterally spaced portion 5b to provide an inclined surface for engagement by the portion 6b of the slide member 6. The opposite end of the film locking member 5 is fixed to the camera body, and like the film locking member 4 it is biased to normally urge the pawl 5a toward the film 2. The pawl 4a has an inclined or beveled edge to permit the downward movement of the film, and similarly, the pawl 5a has an inclined edge to permit the upward movement of the film.

The slide member 6 is provided with longitudinally spaced slots or grooves 6a. The camera body 3 has guide pins 7 fixed thereto, the guide pins extending into the slots 6a so that the slide member 6 is confined for limited up and down movement. The slide member is also provided with a projection 6c for cooperation with an interlocking lever 9. The interlocking lever is rotatably supported upon a shaft 10 and is movable by a control knob (not shown). As shown, the slide member 6 has a tension spring 8 connected to its lower end so that the slide member is normally urged in a downward direction to thereby normally maintain such member's extension or portion 6b in engagement with the portion 5b of the film locking member 5. As a result, the pawl 5a of this film locking member is urged toward retracted position. By rotating the interlocking lever 9 clockwise or counterclockwise, the slide member 6 is moved up or down thereby causing the pawl 4a or 5a to be selectively engaged with the film and inserted into a perforation of the film when the film would have a tendency to move at its rest position to prevent reverse motion of the film. The pawl 4a has an inclined or beveled edge to permit the downward movement of the film, and the pawl 5a has an inclined or beveled edge to permit upward movement of the film.

It will be apparent that the pawls 4a and 5b may be formed to perform reverse stopping action respectively. Also, it is within the scope of the invention to form the portion 6b of the slide member so that it provides an angled or inclined surface cooperable with the portions 4b and 5b of the film locking members which, instead of being inclined as illustrated, may be flat or uninclined.

With a device as above described, and when making a double exposure, the film winding device (not shown) is stopped and, simultaneously, the aforementioned interlocking lever 9 is rotated counterclockwise. Then the sliding member 6 is in its lowermost position because of the action of the aforementioned spring 8. The film locking member 5 undergoes elastic deformation in the direction to cause the pawl 5a to leave the film surface, and the other film locking member 4 is brought nearer to the film surface by elastic force, and its pawl 4a is fitted into a specific perforation of the film 2. When the film is advanced in the direction indicated by the arrow by operating the film advance change-over device (not shown), the pawl 4a is pushed up and slides on the film surface by the action of its inclined edge with the advancement of the film 2 and finally is fitted into the next perforation. When the film is advanced under such conditions, the film accumulates loosely in the film magazine 1 since the film winding device is stopped. The retrogression of the film caused by the spring action produced in the film, or due to the films elasticity, is interrupted by the aforementioned pawl 4a.

Next, when rewinding the film 2, which has once been exposed and stored loosely, and in order to make double exposure, the aforementioned film advance device is operated reversely and simultaneously the interlocking lever 9 is rotated clockwise. Then the pawl 5a of the film locking member 5 works reversely and stops the reverse motion of the film to rewind the film. The aforementioned interlocking lever 9 is naturally interlocked with the aforementioned film advance change-over device. In accordance with conventional means, claw means C is provided for transmitting the film.

It is believed that the advantages and improved results provided by the device of the invention will be apparent from the foregoing detailed description. Various modifications and changes may be made without departing from the spirit and scope of the invention as set forth in the following claims.

What is claimed:

1. A registering device for regulating the rest position of film in a movie camera comprising claw means for intermittently feeding film in forward and reverse directions, a pair of oppositely arranged film locking members each having one end connected to the camera body and an opposite free end, the free ends of the film locking members facing each other, the free end of each film locking member being formed to provide a pawl for entry into a film perforation and a slide member cooperable portion laterally spaced from the pawl, the film locking members each being biased to normally urge the pawls toward the film, and a slide member movable to selectively engage one or the other slide member cooperable portion of the respective film locking members to selectively retract one pawl from the film, the other pawl remaining in engagement with the film.

2. A registering device according to claim 1 wherein each film locking member is fixed to the camera body and is formed of a resilient material.

3. A registering device according to claim 1 wherein each slide member cooperable portion extends from its respective film locking member at an angle to provide an inclined surface for engagement by the slide member.

4. A registering device according to claim 1 wherein the slide member is provided with an inclined surface for engagement with the slide member cooperable portion of each film locking member.

5. A registering device according to claim 1 wherein the slide member is spring biased to normally urge the slide member in engagement with a slide cooperable portion of one film locking member, whereby the pawl of such member is urged toward retracted position.

6. A registering device according to claim 5 wherein the slide member is cooperable with a manually operable, rotatably mounted interlocking lever.

7. A registering device according to claim 6, wherein each film locking member is fixed to the camera body and is formed of a resilient material.

8. A registering device according to claim 7 wherein each slide member cooperable portion extends from its respective film locking member at an angle to provide an inclined surface for engagement by the slide member.

9. A registering device according to claim 7 wherein the slide member is provided with an inclined surface for engagement with the slide member cooperable portion of each film locking member.

References Cited

UNITED STATES PATENTS

| | | | |
|---|---|---|---|
| 3,049,048 | 8/1962 | Miyauchi | 352—91 |
| 2,752,818 | 7/1956 | Gehring | 95—31X |
| 3,237,542 | 3/1966 | Ataka | 95—31 |
| 2,192,692 | 3/1940 | Nerwin | 95—31 |

SAMUEL S. MATTHEWS, Primary Examiner

R. E. ADAMS, Jr., Assistant Examiner

U.S. Cl. X.R.

352—91